(12) United States Patent
Chun et al.

(10) Patent No.: US 7,875,380 B2
(45) Date of Patent: Jan. 25, 2011

(54) COMPLEX MEMBRANE FOR ELECTROCHEMICAL DEVICE, MANUFACTURING METHOD AND ELECTROCHEMICAL DEVICE HAVING THE SAME

(75) Inventors: Suk-Won Chun, Seongnam-si (KR); Jong-Su Park, Seoul (KR); Seong-Mu Jo, Seoul (KR); Hwa-Seop Lee, Seoul (KR)

(73) Assignee: Nanophil Co., Ltd., Yangju (KR)

( * ) Notice: Subject to any disclaimer, the term of this patent is extended or adjusted under 35 U.S.C. 154(b) by 1220 days.

(21) Appl. No.: 10/561,342

(22) PCT Filed: Mar. 31, 2004

(86) PCT No.: PCT/KR2004/000750
§ 371 (c)(1),
(2), (4) Date: Jul. 20, 2006

(87) PCT Pub. No.: WO2004/112183
PCT Pub. Date: Dec. 23, 2004

(65) Prior Publication Data
US 2006/0286446 A1    Dec. 21, 2006

(30) Foreign Application Priority Data
Jun. 17, 2003   (KR) ............... 10-2003-0039239
Dec. 18, 2003   (KR) ............... 10-2003-0093184

(51) Int. Cl.
H01M 2/16   (2006.01)
H01M 10/40  (2006.01)

(52) U.S. Cl. ............ 429/145; 429/144; 429/251; 429/252; 428/315.7; 428/315.9; 156/60; 977/948

(58) Field of Classification Search ............... None
See application file for complete search history.

(56) References Cited

U.S. PATENT DOCUMENTS 4,994,335 A       2/1991   Kamaei et al.
2005/0053830 A1*  3/2005   Akashi et al. ............ 429/144

FOREIGN PATENT DOCUMENTS

| JP | 09-213296 A  | 8/1997 |
| JP | 12-212323 A  | 8/2000 |
| JP | 2000-212323 A | 8/2000 |
| JP | 14-190291 A  | 7/2002 |
| JP | 2002-201298 A | 7/2002 |
| JP | 2002-240215 A | 8/2002 |
| JP | 2003-297680 A | 10/2003 |
| JP | 2003-327731 A | 11/2003 |

* cited by examiner

Primary Examiner—John S Maples
(74) Attorney, Agent, or Firm—Edwards Angell Palmer & Dodge LLP; Kongsik Kim

(57) ABSTRACT

A complex membrane for an electrochemical device such as a lithium secondary battery, its manufacturing method, and an electrochemical device having the complex membrane are disclosed. The complex membrane includes a micro-porous polyolefin membrane, and a web-phase porous membrane united to at least one side of the micro-porous polyolefin membrane and composed of nano-fibers. Since the complex membrane is capable of absorbing an electrolyte uniformly, it greatly improves performance of a battery when being used for an electrochemical device. In addition, owing to excellent mechanical strength and good binding capacity to an electrode, it helps to increase a process rate for manufacturing the battery.

9 Claims, 1 Drawing Sheet

COMPLEX MEMBRANE FOR ELECTROCHEMICAL DEVICE, MANUFACTURING METHOD AND ELECTROCHEMICAL DEVICE HAVING THE SAME

TECHNICAL FIELD

The present invention relates to a complex membrane which may be used for an electrochemical device such as a lithium secondary battery, its manufacturing method and an electrochemical device using the complex membrane.

BACKGROUND ART

Recently, electronic devices become smaller, thinner and lighter rapidly, and particularly in the office automation field, computers are changed from desktop to laptop or notebook. In addition, as an electronic note and an electronic still camera appear, the conventional hard disk and floppy disk are small-sized and a memory card is also researched as a new small memory medium.

Together with such trends of the electronic devices, an electrochemical device for supplying power to the components is also required to have high performance, and a lithium secondary battery is well accorded with this requirement.

The lithium secondary battery is classified on the basis of components of its electrolyte into a lithium ion battery composed of a liquid electrolyte and a lithium polymer battery composed of a solid or gel-type polymer electrolyte, and these batteries use different kinds of membranes having different kinds of polymers and structures.

The lithium ion battery uses a micro-porous film made of polyolefin polymer selected from single polymer such as PE [poly(ethylene)] and PP [poly(propylene)], and copolymer such as ethylene/butene copolymer, ethylene/hexene copolymer and ethylene/methacrylate copolymer, as a membrane. The membrane has one layer, or multi layers like PE/PP or PP/PE/PP as necessary. However, since the polyolefin membrane has no affinity to electrolyte, it is difficult to make various kinds of batteries except a can-shaped battery due to leakage of the liquid electrolyte.

In order to overcome such a problem, a gel-type polymer electrolytic membrane having an affinity to the impregnated electrolyte is proposed.

The gel-type polymer electrolytic membrane is made from copolymer such as PVDF [poly(vinylidene fluoride)] and P(VDF-HFP) [poly(vinylidenefluoride)-co-(hexafluoropropylene)], or polymer such as PAN [poly(acrylonitrile)], PEO [poly(ethylene oxide)], acrylate by means of phase inversion, solution casting, in-situ crosslinking, hot melting or the like.

As a method for manufacturing PVDF gel-type polymer electrolyte using the phase inversion, a process technique of Bellcore Co. (now, its name is changed into Telcordia Technologies Co.) is representative. That is to say, U.S. Pat. No. 5,456,000 and U.S. Pat. No. 6,322,923 disclose a method for manufacturing a cell by making a polymer membrane made of P(VDF-HFP) copolymer added by DBP (dibuthyl phthalate) plasticizer, then inserting this membrane between anode and cathode and laminating them, then perforating the membrane by a plasticizer extracting process and drying it, and then injecting an electrolyte thereto under the anhydrous circumstance.

In addition, U.S. Pat. No. 5,429,891 discloses a method for making an electrolytic membrane by putting a silica inorganic filler and a crosslink agent such as trimethylolpropane trimethacrylate, trimethylolpropane triacrylate or glycerol trimethacrylate together into P(VDF-HFP) copolymer, then film-casting and drying it, and then irradiating an electronic beam thereto for 3-dimensional crosslinkage.

In addition, Korean Laid-open Patent Publication No. 2002-0069601 discloses a method for making a gel-type polymer electrolyte by dissolving PVDF or P(VDF-HFP) copolymer, porous silica and plasticizer into acetone, then coating it on a PET film and then drying, then extracting the plasticizer to form a porous polymer membrane, then coating or dropping a nytril thermosetting polymer on the polymer membrane to make a membrane, then positioning the membrane between cathode and anode, and then applying heat and pressure thereto so as to make the gel-type polymer electrolyte in which cathode/polymer membrane/anode are integrated.

However, the gel-type polymer electrolyte has low mechanical strength of the membrane, so it has a limit in increasing a process rate during the battery manufacturing procedure. In addition, the battery manufacturing procedure is complicated, particularly having an additional plasticizer extracting process, and the electrolyte is penetrated into the membrane ununiformly.

In order to solve these problems, there is proposed a multicomponent system complex polymer electrolytic membrane in which a porous polyolefin membrane is used as a strength support layer and a PVDF polymer is coated or laminated on one or both sides of the support layer as an electrolyte absorption layer.

For example, U.S. Pat. No. 5,681,357, U.S. Pat. No. 5,688,293 and U.S. Pat. No. 5,716,421 disclose a membrane manufacturing method in which a porous polyolefin membrane is dipped into or coated on a polymer composition to make a hybrid electrolyte, and then the polymer composition is polymerized by heat and pressure applied during a packaging process so as to be combined to electrodes. However, the heat and pressure applied during the packaging process may damage the package of the battery, and gas is generated from the composition during a curing process.

In addition, U.S. Pat. No. 5,853,916 discloses a multi-layer polymer gel-type electrolyte made by laminating a gel-type porous PVDF polymer layer and a non-gel micro-porous polymer layer. However, this gel-type porous membrane has a problem that it cannot increase a content ratio of electrolyte due to a low porosity.

In addition, Korean Laid-open Patent Publication No. 2000-0077418 discloses a method for improving a low mechanical strength of a polymer electrolyte by coating electrolyte on both cathode and anode, and then inserting a polyolefin membrane, that is a porous PE (polyethylene) film or a two-layer porous film composed of PE/PP (polyethylene/polypropylene), between them. However, since the gel-type electrolyte coated on the electrodes is sensitively reacted to moisture, the process should be progressed under an anhydrous circumstance. Moreover, since the gel-type electrolyte layer should be coated on both electrodes, it is difficult to manufacture a thin battery.

WO 99/54953 discloses a method in which a polymer suspension solution containing a lithium mixture in a mixed solvent of acetone and NMP (n-methyl pyrrolidone), such as a PEO (polyethylene oxide) suspension solution containing lithium salts such as $LiPF_6$ (lithiumphosphohexafluoride), a PVDF (polyvinylidene fluoride) suspension solution containing lithium salts or a PMMA (polymethyl methacrylate) suspension solution containing lithium salts, is coated on a micro-porous PP (polypropylene) film or a multi-layer microporous laminate film composed of PP/PE/PP and then dried to make a complex polymer electrolyte, and then the made complex polymer electrolyte membrane is positioned between anode and cathode and then dipped in an organic electrolyte solution to finally manufacture a battery. However, since the coated polymer layer in the complex polymer electrolyte has a granular structure, it takes a long time to absorb the organic electrolyte, and an ununiform gel-type layer is formed due to the dipping process.

As mentioned above, the conventional complex multi-component membrane configured by coating a PVDF gel-type polymer layer on a strength support layer or laminating or uniting it in a film shape shows a low absorption rate during injection of electrolyte since the coated electrolyte absorption layer has no internal pore, and a battery performance is deteriorated due to ununiform absorption of electrolyte.

DISCLOSURE OF INVENTION

The present invention is designed to solve the problems of the prior art, and therefore an object of the invention is to provide a complex membrane for an electrochemical device which is capable of remarkably improving the performance of a battery when being used for the electrochemical device by ununiform absorption of electrolyte, giving good mechanical strength and excellent binding capacity to an electrode, and increasing a process rate for manufacturing the battery. The object of the invention is also to provide an electrochemical device having the complex membrane.

In order to accomplish the above object, the present invention provides a complex membrane for an electrochemical device, which includes a micro-porous polyolefin membrane, and a web-phase porous membrane united to at least one side of the micro-porous polyolefin membrane and composed of nano-fibers.

In the complex membrane, it is preferred that the micro-porous polyolefin membrane is a membrane having at least one layer composed of polyethylene polymer and/or polypropylene polymer, and the micro-porous polyolefin membrane preferably has a thickness of 5 to 50 and a porosity of 30 to 80%.

In addition, the nano-fiber preferably has a diameter of 50 to 2,000 nm, and the nano-fiber is also preferably made of polymer selected from the group consisting of PVDF [poly (vinylidene fluoride)], P(VDF-HFP) [poly(vinylidene)-co-(hexafluoropropylene)], PAN [poly(acrylonitrile)], P(VDF-AN) [poly(vinylidene)-co-(acrylonitrile)] copolymer, PEO [poly(ethylene oxide)], PU [poly(urethane)], poly(methylacrylate), PMMA [poly(methyl methacrylate)], PAA [poly (acrylamide)], PVC [poly(vinyl chloride)], PVAc [poly(vinylacetate)], poly(vinylpyrrolidone), polytetraethylene glycol diacrylate, PEGDMA [poly(ethylene glycol dimethacrylate)], cellulose, cellulose acetate, and their mixtures.

In another aspect of the invention, the complex membrane is manufactured using the steps: (a) preparing a micro-porous polyolefin membrane; (b) laminating a web-phase porous membrane made of nano-fibers on at least one surface of the micro-porous polyolefin membrane; and (c) uniting the micro-porous polyolefin membrane with the web-phase porous membrane by applying predetermined pressure and temperature to the result of the step (b). Preferably, the web-phase porous membrane made of nano-fibers may be formed on one surface of the micro-porous membrane by directly spinning a polymer solution by means of electrospinning.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Figure 1:
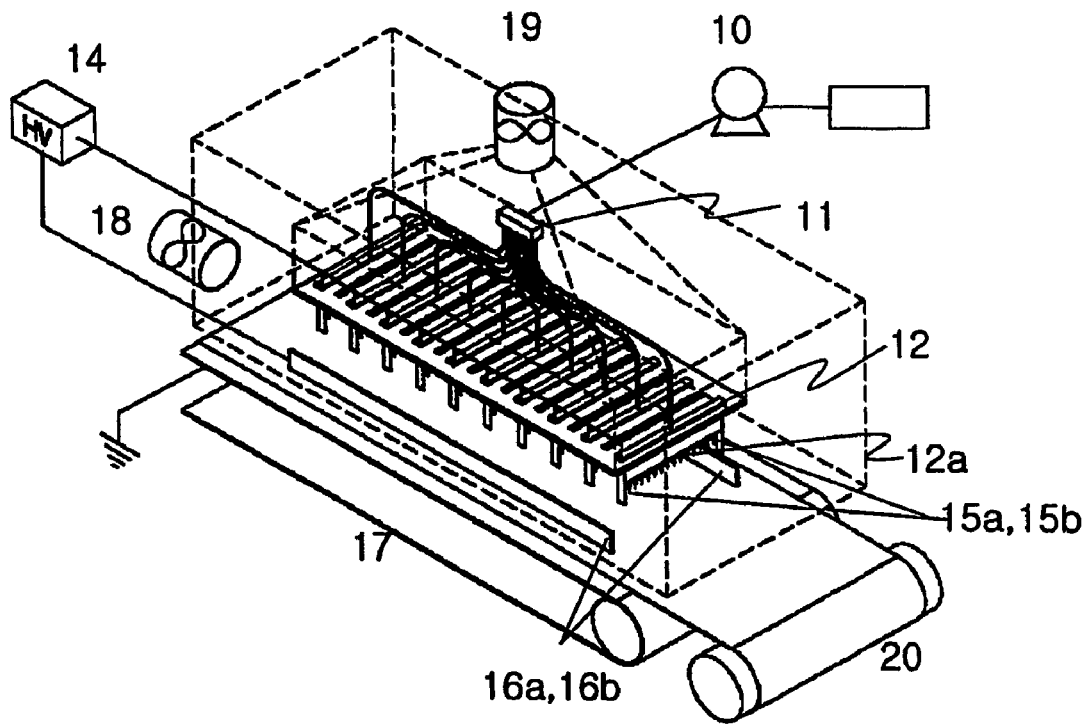
FIG. 1 is a sectional view schematically showing an electrospinning apparatus for manufacturing a web-phase porous membrane made of nano-fibers, which composes a complex membrane for an electrochemical device of the present invention.

Hereinafter, a complex membrane for an electrochemical device, its manufacturing method and an electrochemical device having the complex membrane according to the present invention will be described in detail.

The complex membrane for an electrochemical device according to the present invention has a micro-porous polyolefin membrane, which plays a role of supporting strength of the complex membrane. The first thing required as a strength support layer is a mechanical strength. That is to say, a perforation or puncture strength should be great in order to prevent short-circuit of anode and cathode, a tensile strength should be great to increase a battery manufacturing process rate, and a heat distortion of the membrane such as thermal shrinkage should be small. In addition, considering the stability problem such as explosion of the battery, the membrane is preferably configured as a support body to have a shutdown function so that pores may be closed at a specific temperature. Here, the term 'shutdown function' is a means for controlling thermal runaway which may be caused by physical damage of the battery, short due to internal defects or overcharging, or the like. By using the shutdown function, most of the pores are closed at a specific temperature (90 to 120° C.), thereby blocking ion or current flow. As a material for forming the membrane capable of accomplishing such function, polyolefin polymer is suitable. For example, a PP/PE/PP membrane is provided with the shutdown function since a PE layer is melted at a specific temperature to close pores. Polyolefin polymer suitable for the complex membrane of the present invention includes polyethylene polymer and/or polypropylene polymer, and may use, for example, a porous polyolefin membrane film or nonwoven fabric, a complex composition in which the same kind of nonwoven fabric is laminated on a film, a porous polyamide membrane film or nonwoven fabric, or a porous polyester membrane film or nonwoven fabric, each having a single PE membrane, a single PP membrane, a PE/PP two-layer membrane, a PP/PE/PP three-layer membrane or a complex multi-layer structure composed of PE and PP, which is monoaxial-oriented or biaxial-oriented. Preferably, a porous polyolefin membrane film of a single PE membrane, a PE/PP two-layer membrane or a PP/PE/PP three-layer membrane, which has the shutdown function for prevention of short-circuit between both electrodes, is used. This micro-porous polyolefin membrane may be manufactured according to any conventional method disclosed in EP 1,146,577, U.S. Pat. No. 6,368,742, U.S. Pat. No. 5,691,077, U.S. Pat. No. 6,180,280, U.S. Pat. No. 5,667,911 and U.S. Pat. No. 6,080,507. As for the micro-porous polyolefin membrane of the present invention, a micro-porous polyolefin film placed on the market may be used. For example, Clegard film (PE membrane, PP membrane, PP/PE/PP three-layer membrane) of Celgard Co., Hipore film (PE) of Asahi Kasaei Co., Setela film (PE) of Tonen/ExxonMobil Co., or Teklon film of Entek International Co. may be provided as a micro-porous polyolefin membrane for acting as a strength support layer.

The micro-porous polyolefin membrane used in the complex membrane of the present invention preferably has a thickness of 5 to 50 μm, and a porosity [porosity(%)=1−(apparent density of the membrane)/(resin density)×100] is preferably 30 to 80%. In addition, the micro-porous polyolefin membrane is particularly suitable for an electrochemical device when it has physical characteristics that a tensile strength is more than 700 kg/cm$^2$ in a machine direction (MD) and more than 150 kg/cm$^2$ in a cross-machine direction (CD), a perforation strength is more than 200 g per mil (1 mil=25.4 μm), a shrinkage rate is less than 10% at 100° C. for one hour, and a mean flow pore size is 0.005 to 3 μm, and electric characteristics that an electric resistance is more than 10,000 Ω-cm$^2$ at 130 to 185° C.

A web-phase porous membrane made of nano-fibers is united to one or both sides of the micro-porous polyolefin membrane mentioned above.

The web-phase porous membrane made of nano-fibers may be obtained by electrospinning or electrostatic spinning of polymer solution composed of PVDF [poly(vinylidene fluoride)], or P(VDP-HFP) [poly(vinylidene)-co-(hexafluoropropylene)], or their complex composition, or PAN [poly(acrylonitrile)], P(VDF-AN) [poly(vinylidene)-co-(acrylonitrile)] copolymer, PEO [poly(ethylene oxide)], PU [poly(urethane)], poly(methylacrylate), PMMA [poly(methyl methacrylate)], PAA [poly(acrylamide)], PVC [poly(vinyl chloride)], PVAc [poly(vinylacetate)], poly(vinylpyrrolidone), polytetraethylene glycol diacrylate, PEGDMA [poly(ethylene glycol dimethacrylate)], acrylate, or their copolymer, cellulose, cellulose acetate, or composite of the polymers (preferably, PVDF polymer with the same nature as the binder of an electrode, or complex polymer containing PVDF polymer). When the polymer solution is made, a filler such as $SiO_2$, $TiO_2$, $Al_2O_3$, $BaTiO_3$, $LiO_2$, LiF, LiOH, LiN, BaO, $Na_2O$, MgO, $Li_2CO_3$, $LiAlO_3$, PTFE, or their mixture may be added to the polymer solution in order to enhance a mechanical strength of the result. An amount of the filler is preferably less than 20% of the composed polymer by weight.

The basic mechanism of the electrospinning or electrostatic spinning has been introduced in various documents: [J. M. Deitzel, J. D. Kleinmeyer, J. K. Hirvonen, N. C. Beck Tan, Polymer 42, 8163-8170(2001)], [J. M. Deitzel, J. D. Kleinmeyer, D. Harris, N. C. Beck Tan, Polymer 42, 261-272 (2001)], [Y. M. Shin, M. M. Hohman, M. P. Brenner, G. C. Rutledge, Polymer 42, 9955-9967(2001)].

Now, the basic principle of the electrospinning is described in detail.

In the electrospinning, a positive (+) or negative (−) high voltage of several thousand to several ten thousand volts is directly applied for electric charge of the polymer solution, the charged solution is discharged to an air layer through a capillary nozzle, and then the discharged charged filament is stretched and diverged in the air layer due to mutual repulsion between adjacent filaments, thereby making a superfine fiber with a diameter of several ten to several thousand nanometers. At this time, the superfine fiber electrified by (+) or (−) electric charges is grounded to have a potential difference or accumulated on a collector electrified to an opposite polarity, thereby making a web-phase porous membrane [P. K Baumgarten, Journal of Colloid and Interface Science, Vol. 36, No. 1, 71(1971); G. Taylor, Proc. Roy. Soc. London A, 313, 453 (1969); D. H. Reneker, A. L. Yarine, H. Fong, and S. Koombhongse, J Applied Physics, 876(190, 909(2000); J. Doshi and D. H. Reneker, J. Electrostatics, 35, 151(1995)].

An electrospinning apparatus for implementing such electrospinning method is disclosed in Korean Patent Filing No. 10-2002-48594 in detail, as an example. The electrospinning apparatus is described with reference to FIG. 1.

The electrospinning apparatus includes a solution supply unit 10 for supplying a solution in which a polymer material is dissolved as a fiber material, a spinning nozzle pack 12 composed of a plurality of spinning nozzles 12a for receiving the solution from the solution supply unit and then discharging it in a filament form, a voltage applying unit 14 for applying a predetermined voltage to the spinning nozzle pack for the purpose of electric charge of the solution, jet stream controllers 15a and 15b symmetrically installed with the spinning nozzle pack interposed therebetween for making jet filaments discharged through the nozzles have a uniform spinning state when a voltage is applied thereto so that the jet stream controllers are applied or charged with the same polarity as the charging filament and for controlling a lower accumulation surface of the charged filament, a collector 17 installed below the spinning nozzle pack with a predetermined space and grounded to have a potential difference with the charged filament so that the charged filament discharged through the spinning nozzles are accumulated thereon; porous stream guides 16a and 16b installed to surround the charged filament stream discharged to the collector and installed to guide an accumulation direction of the filaments to be uniformly laminated, a circular supply tube conduit 18 for injecting air to the air layer between the spinning nozzle pack and the collector so as to increase volatility of the solvent contained in the charged filaments, and a circular discharge tube conduit 19 for inhaling the solvent from the air layer between the spinning nozzle pack and the collector and discharging it.

The charged filaments diverged from the air layer and made superfine are accumulated on the collector or accumulated on a film 20 or a releasing paper installed on the collector.

The nano-fiber accumulated as above and composing the web-phase porous membrane preferably has a diameter of 50 to 2,000 nm, more preferably 50 to 1,500 nm. If the diameter of the fiber is too great, a specific surface to weight is decreased, so a pore size in the membrane is accordingly increased, thereby being apt to cause leakage due to deficient retaining ability of the electrolyte.

The web-phase porous membrane united to one or both sides of the micro-porous polyolefin membrane may greatly improve the performance of the electrochemical device by uniformly absorbing sufficient electrolyte, and also improve a process rate due to excellent binding capacity with the electrode. The web-phase porous membrane preferably has a thickness of 50 μm or below, which should be determined on the consideration of the total thickness of the complex membrane to be finally made of course. However, if the membrane is too thick, it is difficult to manufacture a thin electrochemical device. The web-phase porous membrane preferably has a porosity of 60 to 95%, more preferably 65 to 90%. The web-phase porous membrane preferably has a mean flow pore size (MFPS) of 0.01 to 3 μm, more preferably 0.05 to 2 μm. If MFPS is too small, an absorption rate of electrolyte is slow during dipping of the electrolyte, while, if MFPS is too great, leakage of electrolyte may be caused.

The web-phase porous membrane composing the complex membrane preferably has a MD (Machine Direction) tensile strength of 50 kgf/cm$^2$ (1 kgf/cm$^2$=9.8 MPa) or above and a CD (Cross-machine Direction) tensile strength of 20 kgf/cm$^2$ or above. In particular, the web-phase porous membrane preferably passes through a pressing roll in order to give strength and shape stability to the membrane. The pressing is conducted in the range of 0.1 to 10 kgf/cm. A thickness reduction rate of the membrane is preferably 10 to 60% after the pressing. Meanwhile, the pressed membrane may experience a stretching process. Preferably, monoaxial- or biaxial-stretching is used to have a total stretching ratio is 1 to 20 times, more preferably 2 to 10 times.

The web-phase porous membrane made as mentioned above is laminated on one or both sides of a micro-porous polyolefin membrane, and then both membranes are united with each other by means of a lamination process which applies predetermined pressure and temperature thereto, thereby manufacturing a complex membrane for an electrochemical device according to the present invention. The lamination process is preferably conducted with a linear pressing load of 0.1 to 30 kgf/cm at a temperature lower than a melting point of the polymer as much as 3 to 30° C. If the temperature is high during pressing, the membrane is melt, while, if the pressure is too high, porosity is decreased disadvantageously. The web-phase porous membrane may be directly electrospun on a micro-porous polyolefin membrane so as to be stacked on the web-phase porous membrane, and then laminated under the same condition as mentioned above. At this time, the micro-porous polyolefin membrane may be carried together with the collector or carried with an interval less than 1 cm from the upper surface of the collector when being accumulated.

The complex membrane for an electrochemical device manufactured as described above may be a two-layer complex membrane composed of a web-phase porous membrane and a micro-porous polyolefin membrane, a three-layer complex membrane composed of a web-phase porous membrane, a micro-porous polyolefin membrane and a web-phase porous membrane in order, or a multi-layer complex membrane in which a web-phase porous membrane and a micro-porous polyolefin membrane are laminated more than three layers. A porosity of the complex membrane is preferably 40% or above. If the porosity is low, a dipping rate of electrolyte is decreased, which makes the complex membrane not suitable for a membrane of a high-performance battery.

A total thickness of the complex membrane is preferably 5 to 70 μm. If the thickness of the membrane is less than 5 μm, film strength is weak, which may cause a problem in the battery manufacturing procedure. If the thickness exceeds 70 μm, ion conductivity may be deteriorated. More preferably, the thickness is 10 to 30 μm. A tensile strength is more than 1000 kg/cm$^2$ in a machine direction and more than 100 kg/cm$^2$ in a cross-machine direction. A mean flow pore size is preferably 0.01 to 1.5 μm.

The complex membrane manufactured in such a way may be used, for example, as an electrolytic membrane for a lithium secondary battery according to a general battery manufacturing procedure, and it is used for manufacturing an electrochemical device such as a lithium secondary battery. The complex membrane is interposed between anode and cathode, and then forms an electrode structure in which electrodes and membrane are integrated through the lamination procedure. The electrode structure is put in a battery case, then injecting an organic electrolyte into the battery case and sealing the case to make an electrochemical device. At this time, the web-phase porous membrane forms a gel-type polymer layer after the injection of electrolyte due to affinity to the electrolyte. The injected organic electrolyte is in a state that a lithium salt such as LiPF$_6$ (lithiumphospho hexafluoride), LiClO$_4$ (lithiumperchlorate), LiBF$_4$ (lithiumtetrafluoroborate), and LiCF$_3$SO$_3$ (lithiumtrifluoromethanesulfonate) is dissolved in an organic solvent. The organic solvent may be PC (propylene carbonate), EC (ethylene carbonate), DMC (dimethyl carbonate), DEC (diethyl carbonate), dipropyl carbonate, EMC (ethylmethyl carbonate), γ-butyrolactone, or their mixtures.

Hereinafter, preferred embodiments of the present invention will be described in detail. However, the description proposed herein is just a preferable example for the purpose of illustrations only, not intended to limit the scope of the invention, so it should be understood that other equivalents and modifications could be made thereto without departing from the spirit and scope of the invention.

EMBODIMENTS

In the embodiments below, the electrospinning apparatus shown in FIG. 1 is used, and its detailed specification is as follows.

A spinning solution is carried from a tank to the spinning nozzle pack by means of a precise carrier to which a metering pump is mounted. The spinning nozzle pack has capillary nozzles with an inner diameter of 0.2 mm, an outer diameter of 0.4 mm and a capillary length of 10 mm, and an interval between nozzles is 26 mm. A distance between the packs is set to 20 cm. The spinning nozzle pack repeatedly moves 6 m per minute in right and left direction.

Each spinning nozzle pack is connected to a high-voltage generating unit [DEL Global Technologies, a model name of RLPS50-300P, an output power of 50 KV, an output current of 3 mA, (+) polarity] so that the spinning solution is charged. At this time, an applied voltage is a (+) DC voltage of 20 to 40 kv.

The jet stream control plates made of an aluminum metal plate with a thickness of 0.4 mm and a width of 40 mm are vertically installed in parallel with the pack at positions spaced apart from right and left sides of the spinning nozzle pack as much as 3 cm. At this time, a lowest end of the control plate is positioned identical to a lowest end of the nozzle tip. The same voltage as applied to the spinning solution is applied to these jet stream control plates.

In addition, stream guides 6a and 6b are installed to be spaced from each other at positions spaced apart from right and left sides of the discharged charged filament stream as much as 5 cm, and positioned within 1 cm below the spinning nozzle pack and 1 cm above the collector. The collector is a conveyor adopting a metal belt (SUS 304) and in a grounded state. The collector is installed spaced apart from the nozzle tip as much as 20 cm.

Figure 2:
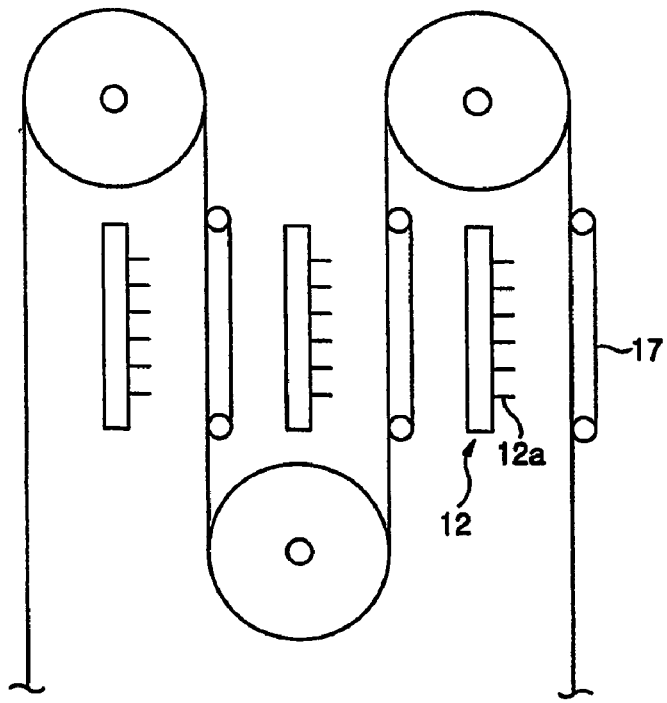
FIG. 2 is a schematic view showing a vertical electrospinning apparatus for manufacturing a web-phase porous membrane made of nano-fibers, which composes a complex membrane for an electrochemical device of the present invention.

Meanwhile, FIG. 2 is an electrospinning apparatus in which the spinning nozzle packs and the collectors are repeatedly arranged in a vertical relation. This electrospinning apparatus is used for directly forming web-phase porous membranes on both sides of a polyolefin membrane.

Properties of the manufactured complex membrane are measured as follows.

1. Pore Size

A mean flow pore size (MFPS) and a maximum pore size are measured by means of an automated capillary flow porometer [PMI (Porous Materials Inc.), Model CFP-1200AEL (CFP-34RTF8A-X-6-L4)]. A wetting fluid used for the measurement is galwick acid with a surface tension of 15.9 dynes/cm. An adopter plate has a diameter of 21 mm, and the wet-up/dry-up is selected as a measurement method.

2. SEM

A fiber diameter is analyzed by means of SEM (Spectroscan Leica's Model 440). ×10 k and ×20 k magnifications are used for observation.

3. Mechanical Features

Tensile strength and elongation of the web-phase porous membrane are measured by means of a tension tester (Instron's Model 4201). At this time, a weight of used load cell is 2.5 kg.

Embodiment 1

A micro-porous polyolefin PP membrane acting as a strength support layer adopts a porous film (Celgard, a product name of Celgard 2500) having properties such as a thickness of 25 μm, a porosity of 55%, a pore size of 0.209×0.054 μm, an air flow resistance of Gurley 9 seconds, a tensile strength in MD of 1200 kg/cm$^2$, a tensile strength in CD of 115 kg/cm$^2$, and a shrinkage rate of 3%.

Meanwhile, the web-phase porous membrane is manufactured using the aforementioned electrospinning apparatus with the use of PVDF [poly(vinylidene fluoride)] polymer. That is to say, PVDF-HFP (88 mol %: 12 mol %) [poly(vinylidenefluoride-co-hexafluoro propylene)] copolymer [Elf Atochem North America, Inc., a product name of Kynar Flex 2801: a number-average molecular weight (Mn)=120,000, a weight-average molecular weight (Mw)=380,000, a specific weight of 1.77 g/cc, a melting point of 143° C.] is dissolved in a mixed solvent of acetone and DMAc with a weight ratio of 7:3 to make a polymer solution of 13 wt %, which is then electrospun. At this time, a discharging amount for each spinning nozzle is 20 μl/minute, and an applied voltage is 28 kv.

A membrane accumulated on the collector is separated from the collector, and the made web-phase porous membrane has a fiber diameter of 70 to 500 nm, a porosity of 80%, and a MFPS of 1 μm. The thickness was 10 μm.

The web-phase porous membrane is stacked on both sides of the aforementioned micro-porous PP membrane to make a three-layer structure, and it passes through a laminator (GMP, a model: EXCEL AM-655Q) under the condition of a temperature of 140° C., a linear pressure of 0.5 kg/cm, and a moving speed of 20 cm/minute to manufacture a complex membrane in which the web-phase porous membranes are united to both sides of the micro-porous PP membrane.

The manufactured complex membrane has a total thickness of 33 μm, a porosity of 58%, MFPS of 0.136 μm, and a maximum pore size of 2.65 μm. It is revealed that its mechanical features are identical to those of porous PP film.

Embodiment 2

A micro-porous polyolefin PP membrane acting as a strength support layer adopts a porous film (Celgard, a product name of Celgard 2500) having properties such as a thickness of 25 μm, a porosity of 55%, a pore size of 0.209×0.054 μm, an air flow resistance of Gurley 9 seconds, a tensile strength in MD of 1200 kg/cm$^2$, a tensile strength in CD of 115 kg/cm$^2$, and a shrinkage rate of 3%.

Meanwhile, the web-phase porous membrane is manufactured by complex spinning of different kinds of PVDF polymers. That is to say, a polymer solution in which 100% single PVDF polymer [Elf Atochem North America, Inc., a product name of Kynar 761] is 15 wt % dissolved in a mixed solution of acetone and DMAc with a weight ratio of 5:5, and a polymer solution in which PVDF-HFP (88 mol %: 12 mol %) [poly(vinylidenefluoride-co-hexafluoro propylene)] copolymer [Elf Atochem North America, Inc., a product name of Kynar Flex 2801: a number-average molecular weight (Mn)=120,000, a weight-average molecular weight (Mw)=380,000, a specific weight of 1.77 g/cc, a melting point of 143° C.] is 13 wt % dissolved in an acetone solvent is used. The polymer solutions are supplied to a separate spinning nozzle pack and then spun with the same electrospinning apparatus as is used in the embodiment 1. At this time, a distance between the spinning nozzle packs is 20 cm, and the polymer solutions are discharged 20 μl/minute, respectively. An applied voltage is 28 kv for the 100% single PVDF polymer and 21 kv for the 88% PVDF copolymer. A distance between the tip and the collector is 20 cm.

A membrane accumulated on the collector by means of complex spinning has a fiber diameter of 70 to 700 nm, wherein thin diameter and thick diameter are mixed. A thickness of the made membrane was 10 μm.

The manufactured membrane is stacked on both sides of a micro-porous PP membrane (film) to make a three-layer structure, and it passes through a laminator (GMP, a model: EXCEL AM-655Q) under the condition of a temperature of 140° C., a linear pressure of 1 kg/cm, and a moving speed of 20 cm/minute to manufacture a complex membrane in which the porous PVDF membranes are united to both sides of the micro-porous PP membrane.

The manufactured complex membrane has a total thickness of 33 μm, a porosity of 60%, MFPS of 0.136 μm, and a maximum pore size of 2.65 μm. It is also revealed that its mechanical features are identical to those of porous PP film.

Embodiment 3

A micro-porous polyolefin PE membrane acting as a strength support layer adopts a porous film (Celgard, a product name of Celgard 2730) having properties such as a thickness of 21 μm, a porosity of 43%, a pore size of 0.110×0.054 μm, an air flow resistance of Gurley 22 seconds, a tensile strength in MD of 1700 kg/cm$^2$, a tensile strength in CD of 120 kg/cm$^2$, a shrinkage rate of 5%, and a melting point of 135° C.

The web-phase porous membrane is manufactured with the use of 13 wt % polymer solution which is made by dissolving PVDF-HFP (88 mol %: 12 mol %) [poly(vinylidenefluoride-co-hexafluoro propylene)] copolymer [Elf Atochem North America, Inc., a product name of Kynar Flex 2801: a number-average molecular weight (Mn)=120,000, a weight-average molecular weight (Mw)=380,000, a specific weight of 1.77 g/cc, a melting point of 143° C.] in a mixed solvent of acetone and DMAc with a weight ratio of 4:6.

The electrospinning apparatus is configured that the spinning nozzle packs 12 and the conveyor-type metal (SUS 304) collectors 17 are vertically installed in series as shown in FIG. 2, and the PE film is put on the upper surface of the collector so that it may pass together with the collector. The spinning process is directly conducted on both sides of the PE film put on the upper surface of the collector. At this time, a discharging amount for each spinning nozzle is 50 μl/minute, an applied voltage is 28 kv, and a distance between the tip and the collector is 20 cm. A filament composing the membrane on the PE film made by the apparatus has a diameter of 300 to 1,000 nm, and a sectional thickness of the membrane is 10 μm, respectively.

A three-layer structure having the web-phase porous membranes on both sides of the porous PE film is passed through a laminator (GMP, a model: EXCEL AM-655Q) under the condition of a temperature of 120° C., a linear pressure of 1 kg/cm, and a moving speed of 20 cm/minute to unite the membranes and the film, thereby manufacturing a complex membrane.

The manufactured complex membrane has a total thickness of 30 μm, a porosity of 45%, MFPS of 0.304 μm, and a maximum pore size of 1.10 µM. It is also revealed that its mechanical features are identical to those of porous PE film.

Embodiment 4

A micro-porous polyolefin membrane acting as a strength support layer adopts a porous film (Celgard, a product name of Celgard 2300) composed of a multi-layer membrane of polyethylene/polypropylene/polyethylene (PP/PE/PP), which has properties such as a thickness of 25 µm, a porosity of 36%, a pore size of 0.05×0.11 µm, a shrinkage rate in MD of 5% (90° C., 60 min), an air flow resistance of Gurley 25 seconds, a tensile strength in MD of 1560 kg/cm² (22 kpsi), a tensile strength in CD of 135 kg/cm² (2 kpsi), and a melting point of 135° C. (PE)/165° C. (PP).

The web-phase porous membrane is manufactured with the use of 13 wt % polymer solution which is made by dissolving PVDF-HFP (88 mol %: 12 mol %) [poly(vinylidenefluoride-co-hexafluoro propylene)] copolymer [Elf Atochem North America, Inc., a product name of Kynar Flex 2801: a number-average molecular weight (Mn)=120,000, a weight-average molecular weight (Mw)=380,000, a specific weight of 1.77 g/cc, a melting point of 143° C.] in a mixed solvent of acetone and DMAc with a weight ratio of 4:6.

The electrospinning apparatus is identical to that of the embodiment 3, and the PP/PE/PP film passes with being spaced from the upper surface of the collector as much as 5 mm. At this time, a discharging amount for each spinning nozzle is 20 µl/minute, an applied voltage is 28 kv, and a distance between the tip and the collector is 20 cm. The spinning process is directly conducted on the PP/PE/PP film which passes above the upper surface of the collector, and charged filaments are accumulated on both surfaces of the PP/PE/PP film with passing through each group of spinning nozzle pack and collector. The fibers accumulated on the film have a diameter of 300 to 700 nm, and a section thickness of the membrane is 5 µm, respectively.

A three-layer structure made as mentioned above is passed through a laminator (GMP, a model: EXCEL AM-655Q) under the condition of a temperature of 100° C., a linear pressure of 1 kg/cm, and a moving speed of 20 cm/minute, thereby manufacturing a complex membrane in which the web-phase porous PVDF membrane is united.

The manufactured complex membrane has a total thickness of 30 µm, a porosity of 37%, MFPS of 0.127 µm, and a maximum pore size of 2.31 µm. It is also revealed that its mechanical features are identical to those of porous PP/PE/PP film.

Embodiment 5

A micro-porous polyolefin PE membrane acting as a strength support layer adopts a porous film (Celgard, a product name of Celgard 2730) having properties such as a thickness of 21 µm, a porosity of 43%, a pore size of 0.110×0.054 µm, an air flow resistance of Gurley 22 seconds, a tensile strength in MD of 1700 kg/cm², a tensile strength in CD of 120 kg/cm², a shrinkage rate of 5%, and a melting point of 135° C.

The web-phase porous membrane is manufactured with the use of 13 wt % polymer solution which is made by dissolving PVDF-HFP (88 mol %: 12 mol %) [poly(vinylidenefluoride-co-hexafluoro propylene)] copolymer [Elf Atochem North America, Inc., a product name of Kynar Flex 2801: a number-average molecular weight (Mn)=120,000, a weight-average molecular weight (Mw)=380,000, a specific weight of 1.77 g/cc, a melting point of 143° C.] in a mixed solvent of acetone and DMAc with a weight ratio of 6:4.

The electrospinning apparatus is identical to that of the embodiment 1. At this time, a discharging amount for each spinning nozzle is 50 µl/minute, an applied voltage is 28 kv, and a distance between the tip and the collector is 20 cm.

The fiber-type porous membrane manufactured by the apparatus has a fiber diameter of 300 to 1,000 nm and a membrane thickness of 10 µm.

The web-phase porous membrane is supplied to and stacked on both sides of the porous PE film, and the stacked three-layer structure is passed through a laminator under the condition of a temperature of 100° C., a linear pressure of 1 kg/cm, and a moving speed of 20 cm/minute, thereby manufacturing a complex membrane in which the web-phase porous membrane is united to the micro-porous PE membrane.

The manufactured complex membrane has a total thickness of 23 µm, a porosity of 43%, MFPS of 0.304 µm, and a maximum pore size of 1.10 µm. It is also revealed that its mechanical features are identical to those of porous PE film.

Embodiment 6

The spinning condition is identical to the embodiment 2, but the complex spinning is conducted with a ratio of 8:2 by using PMMA [poly(methyl methacrylate), Mw=120,000] instead of PVDF-HFP copolymer. It is revealed that the complex membrane in which the web-phase porous membranes made as mentioned above are united to both sides of a micro-porous PP membrane shows the same properties as a porous PP film supplied as an internal support layer.

The manufactured complex membrane has a total thickness of 33 µm, a porosity of 60%, MFPS of 0.136 µm, and a maximum pore size of 2.65 µm.

INDUSTRIAL APPLICABILITY

As described above, the complex membrane according to the present invention ensures great strength, rapid absorption of liquid electrolyte, and uniform dispersion and penetration of electrolyte, resultantly improving the performance of an electrochemical device since the complex membrane has a micro-porous polyolefin membrane as a strength support layer and a web-phase porous membrane is united to one or both sides of the micro-porous polyolefin membrane. In addition, the web-phase porous membrane, an exterior layer of the complex membrane, may improve a process rate for manufacturing a battery when it is provided as an electrolytic membrane of an electrochemical device such as a lithium secondary battery if the web-phase porous membrane is formed with a substance having a binding capacity to an electrode binder material.

What is claimed is:

1. A complex membrane for an electrochemical device, comprising:
   a strength support layer; and
   a web-phase electrospinning membrane united to at least one side of the strength support layer and made of polymer,
   wherein the strength support layer is a micro-porous polyolefin membrane having a mean flow pore size of 0.005 to 3 µm and a porosity of 30 to 80%, and
   wherein the electrospinning membrane is a web-phase porous membrane in which nano-fibers are accumulated by electrospinning to have a mean flow pore size of 0.01 to 3 µm and a porosity of 60 to 95%, whereby the complex membrane is a multi-layer complex membrane having a mean flow pore size of 0.01 to 1.5 µm, a porosity of 40% or above and a thickness of 5 to 70 µm.

2. The complex membrane according to claim 1, wherein the micro-porous polyolefin membrane is a membrane having at least one layer composed of polyethylene polymer and/or polypropylene polymer.

3. The complex membrane according to claim 2, wherein the strength support layer has a thickness of 5 to 50 µm.

4. The complex membrane according to claim 3, wherein the nano-fiber is made of polymer selected from the group consisting of poly(vinylidene fluoride) (PVDF), poly(vinylidene)-co-(hexafluoropropylene) [P(VDF-HFP)], poly(acrylonitrile) (PAN), poly(vinylidene)-co-(acrylonitrile) [P(VDF-AN)] copolymer, poly(ethylene oxide) (PEO), poly(urethane) (PU), [P(VDF-AN)] copolymer, poly(methylacrylate), poly(methyl methacrylate) (PMMA), poly(acrylamide) (PAA), poly(vinyl chloride) (PVC), poly(vinylacetate) (PVAc), poly(vinylpyrrolidone), polytetraethylene glycol diacrylate, poly(ethylene glycol dimethacrylate (PEGDMA), cellulose, cellulose acetate, and mixtures thereof.

5. The complex membrane according to claim 4, wherein the polymer of the nano-fiber further contains a filler selected from the group consisting of $SiO_2$, $TiO_2$, $Al_2O_3$, $BaTiO_3$, $LiO_2$, LiF, LiOH, LiN, BaO, $Na_2O$, MgO, $Li_2CO_3$, $LiAlO_3$, PTFE, and mixtures thereof.

6. A method for manufacturing the complex membrane for an electrochemical device, defined in the claim 1, comprising:
   (a) preparing a micro-porous polyolefin membrane;
   (b) laminating a web-phase porous membrane made of nano-fibers on at least one side of the micro-porous polyolefin membrane; and
   (c) uniting the micro-porous polyolefin membrane with the web-phase porous membrane by applying predetermined pressure and temperature to the result of the step (b).

7. The method for manufacturing the complex membrane according to claim 6, wherein, in the step (b), the web-phase porous membrane made of nano-fibers is laminated on one surface of the micro-porous membrane by directly spinning a polymer solution by means of electrospinning.

8. An electrochemical device, comprising:
   an anode;
   a cathode; and
   a separator and an organic electrolyte interposed between the anode and the cathode,
   wherein the separator is the complex membrane defined in the claim 1.

9. The complex membrane according to claim 5, wherein the electrospinning membrane has a thickness of 50 µm or below.

* * * * *